(12) United States Patent
Schulz

(10) Patent No.: US 10,906,133 B2
(45) Date of Patent: Feb. 2, 2021

(54) METHOD OF REMOVING COATING FROM A SURFACE OF A WHEEL

(71) Applicant: SLCR-Lasertechnik GmbH, Düren (DE)

(72) Inventor: Olav Schulz, Bergheim (DE)

(73) Assignee: SLCR-Lasertechnik GmbH, Düren (DE)

( * ) Notice: Subject to any disclaimer, the term of this patent is extended or adjusted under 35 U.S.C. 154(b) by 375 days.

(21) Appl. No.: 15/819,216

(22) Filed: Nov. 21, 2017

(65) Prior Publication Data

US 2018/0141164 A1 May 24, 2018

(30) Foreign Application Priority Data

Nov. 23, 2016 (DE) .......................... 10 2016 122 629

(51) Int. Cl.
*B23K 26/362* (2014.01)
*B23K 26/16* (2006.01)
(Continued)

(52) U.S. Cl.
CPC .......... *B23K 26/362* (2013.01); *B08B 7/0042* (2013.01); *B08B 15/04* (2013.01); *B23K 26/02* (2013.01); *B23K 26/082* (2015.10); *B23K 26/16* (2013.01); *B23K 26/361* (2015.10); *B23K 26/402* (2013.01); *B60B 3/00* (2013.01);
(Continued)

(58) Field of Classification Search
CPC .. B23K 26/362; B23K 26/402; B23K 26/361; B23K 26/082; B23K 26/02; B23K 26/16; B23K 2101/34; B23K 2101/006; B23K 26/36; B08B 15/04; B08B 7/0042; B60B 3/00; B60B 30/06
See application file for complete search history.

(56) References Cited

U.S. PATENT DOCUMENTS 5,613,509 A * 3/1997 Kolb ...................... B24C 1/003
134/1
5,662,762 A * 9/1997 Ranalli ................. B08B 7/0042
156/707

(Continued)

FOREIGN PATENT DOCUMENTS

DE      102008009704 A1    8/2009
DE      102012108691 A1    5/2014
WO      WO2016124656 A1    8/2016

*Primary Examiner* — Patrick M. Buechner
(74) *Attorney, Agent, or Firm* — Berenato & White, LLC

(57) ABSTRACT

A method for removing a coating of a surface of a wheel. The wheel is provided with screw channels and with a centrally positioned hub opening. Each of the screw channels and the central opening is delimited by an area from which the coating is to be removed. Each of the areas extends annularly around one of the screw channels or around the hub opening. The method is implemented using a laser beam generated by a laser source. The method comprises the steps of positioning an extraction opening directly beneath a center of one of the screw channels or the central opening surrounded by the area, moving the laser beam over the area without masking the area (7) from which the coating is to be removed, and extracting gases and particles produced during the step of removing the coating directly through one of the screw channels or the central opening.

18 Claims, 7 Drawing Sheets

(51) Int. Cl.

| | |
|---|---|
| *B23K 26/402* | (2014.01) |
| *B08B 15/04* | (2006.01) |
| *B60B 3/00* | (2006.01) |
| *B08B 7/00* | (2006.01) |
| *B23K 26/361* | (2014.01) |
| *B60B 30/06* | (2006.01) |
| *B23K 26/082* | (2014.01) |
| *B23K 26/02* | (2014.01) |
| *B23K 101/34* | (2006.01) |
| *B23K 101/00* | (2006.01) |

(52) U.S. Cl.
CPC ........ B60B 30/06 (2013.01); *B23K 2101/006* (2018.08); *B23K 2101/34* (2018.08)

(56) References Cited

U.S. PATENT DOCUMENTS

| | | | | |
|---|---|---|---|---|
| 5,668,731 | A * | 9/1997 | Mancosu | B23K 26/0823 |
| | | | | 157/13 |
| 5,735,965 | A * | 4/1998 | Baldi | B08B 5/02 |
| | | | | 134/21 |
| 2003/0151053 | A1* | 8/2003 | Sun | H01L 23/5258 |
| | | | | 257/79 |
| 2005/0103763 | A1 | 5/2005 | Momose | |
| 2011/0186553 | A1* | 8/2011 | Chung | H01M 2/26 |
| | | | | 219/121.69 |
| 2012/0121749 | A1 | 5/2012 | Sakai | |
| 2016/0016312 | A1* | 1/2016 | Lawrence, III | G01N 21/9515 |
| | | | | 700/98 |
| 2017/0304951 | A1* | 10/2017 | Lee | B23K 26/1464 |
| 2017/0314754 | A1* | 11/2017 | Schragl | F21S 45/70 |
| 2019/0337098 | A1* | 11/2019 | Stammeier | B23K 26/362 |

\* cited by examiner

METHOD OF REMOVING COATING FROM A SURFACE OF A WHEEL

CROSS-REFERENCE TO RELATED APPLICATIONS AND CLAIM TO PRIORITY

This application is related to application number 10 2016 122 629.7, filed Nov. 23, 2016, in the Federal Republic of Germany, the disclosure of which is incorporated herein by reference and to which priority is claimed.

FIELD OF THE INVENTION

The present invention relates to a method for removing the coating of a surface, provided with a coating, of a wheel provided with screw channels and with a centrally positioned opening within one or a number of areas from which the coating is to be removed, which areas extend annularly, in particular circularly, around one of the screw channels and/or around the opening, the method being implemented using a laser beam generated by a laser source.

BACKGROUND OF THE INVENTION

Coated wheels are known in the prior art in a wide variety of configurations, for example in the form of painted light metal wheels. As stipulated by the automotive manufacturers, the functional surfaces extending annularly around the respective screw channels of such wheels, which surfaces are also called caps and subsequently respectively serve as the contact surface for the head of a fastening screw, must be free from paints so that the fastening screws can be tightened with consistent torque during assembly. A layer of paint in the region of these functional surfaces would lead to the pre-determined torque upon tightening the fastening screws being changed due to the paint that is enclosed, as a result of which inadvertent loosening of the fastening screws is assisted with standardised assembly of the wheels. Furthermore, a paint-free surface around the central opening, which is also called the hub, is also required.

In order to achieve paint-free functional surfaces it is known to mask the corresponding functional surfaces before coating, for which purpose balls or stoppers are mostly used. However, such masking often leads to an inconsistent result, and this is associated with problems relating to quality assurance. Moreover, the masking requires an additional procedural step, and this leads to high costs.

Another possibility for achieving paint-free functional surfaces consists of subsequently removing the coating from the coated surfaces of the wheels in the region of the functional surfaces. Achieving the coating removal precision required by the automotive manufacturers is particularly problematic here, in particular the formation of a precise outer margin of the areas from which the coating has been removed.

In this connection, since 2008 the present applicant has been offering a coating system which is specifically designed for removing the coating from caps. The coating is removed by using a pulsed $CO_2$ laser beam with a pulse duration of approximately 2 µs and a pulse power of more than 6 J, the beam being guided by deflection and focussing mirrors. In this way an oval to rectangular processing spot with a surface area of approximately 1 cm² is produced. Due to the size of the processing spot and the coat removal precision required by the automotive manufacturers, masking is however also required with this method. This masking is achieved by using a tubular beam tube which forms the laser beam and which is placed directly onto the areas from which the coating is to be removed during the removal of the coating. The laser beam is guided through the beam tube via a four-axis system (X, Y, Z and R axis), all of the beam guidance and beam forming optics being assembled and set up in order to apply the laser beam through the beam tube to the area from which the coating is to be removed in the required manner. Any vapours and particles that are produced during the removal of the coating are removed by applying pressure to the beam tube so that vapours and any material that has been removed are blown out through the corresponding screw channel. Positioned beneath the wheel mount or the path of conveyance extending through the coating removal system is an extraction device which sucks off the vapours and particles blown off in an uncontrolled manner through the respective screw channel. In order to determine the precise position of the areas from which the coating is to be removed, the coating removal system has a camera system which records the precise position of the screw channels and so of the areas from which the coating is to be removed. The processing time is basically determined from the number of areas, per wheel, from which the coating is to be removed, and from the layer thickness of the paint. Up until now it has been restricted to approx. 250 wheels per hour by the switching processes and the available laser power.

A disadvantage of the coating system described above is that the masking of the areas from which the coating is to be removed by means of the beam tube is associated with a number of problems. On the one hand, it must be guaranteed that the beam tube is placed tightly on the surface of the wheel from which the coating is to be removed in order to be able to generate the overpressure which is required to blow off the gases and particles within the beam tube. However, this type of seal is always prone to failure. On the other hand, the fact that the beam tube must be placed over each of the individual areas from which the coating is to be removed also has a negative effect, however, upon the achievable cycle length. A similar thing arises from the fact that the beam tube has to be replaced when there is a change to the wheels or to the cap shape that are to be processed, and this entails corresponding changeover times. Furthermore, the positioning of the beam tube often leads to mechanical defects on the existing paint along the contact line, and this results in loss of quality.

Subsequent removal of the coating from the functional surfaces by mechanical processing, such as for example using a countersink or the like, is rejected on the basis of other stipulations of the automotive industry.

SUMMARY OF THE INVENTION

On the basis of this prior art, it is an object of the present invention to devise a coat removal method of the type specified at the start, by means of which the coating can be removed from a surface, provided with a coating, of a wheel provided with screw channels and an opening within one or a number of areas from which the coating is to be removed, which areas respectively extend annularly, in particular circularly, around one of the screw channels and/or around the opening, inexpensively, quickly, easily and with a high degree of processing precision.

In order to achieve this object, the present invention devises a method of the type specified at the start which is characterised in that the laser beam is moved over the area or areas of the surface from which the coating is to be removed, without limiting the area or areas from which the coating is to be removed by additional means. In other words, the method according to the invention is characterised in that during the removal of the coating, one dispenses entirely with any masking. One can thus dispense in particular with the use of a beam tube. Accordingly, the method according to the invention can be implemented comparatively inexpensively, quickly and easily.

In order to achieve a high degree of processing precision it is advantageous to move the laser beam over the area or areas of the surface from which the coating is to be removed by means of a scanner device, in particular a displaceable scanner device. An advantage of this type of scanner device in comparison to other beam guidance and beam formation optics is that one can achieve processing spots of any surface area, by means of which the achievable flexibility as well as the coating removal precision are substantially improved.

Advantageously, a $CO_2$ laser is used as the laser source, the laser beam that is generated preferably being in the wavelength range of 9 to 11 µm, and/or the laser source being operated in particular in the cw mode.

Alternatively, a fibre laser or an Nd:YAG laser in the cw mode or in the pulsed mode can be used as the laser source, the laser beam that is generated being in particular in the wavelength range of 1 to 1.1 µm, even if the use of a $CO_2$ laser is preferred in this case.

According to one embodiment of the method according to the invention, in a first step the wheel is fixed. It can be fixed, for example, by means of fixing elements which are arranged along a conveyance path extending through the coating removal system. Advantageously, the fixing takes place not only in the horizontal, but also in the vertical direction so that the wheel that is to be processed is held in a strictly defined, preferably centred position during the removal of the coating. In another step the positions of the screw channels and of the opening of the wheel are automatically recorded, preferably using an appropriately configured camera system. Thus, for example, there can be positioned beneath the conveyance path or workpiece support a light source which illuminates the wheel from which the coating is to be removed from below through an opening provided in the conveyance path or the workpiece support, at least in the region of the screw channels. Positioned above the wheel is a transparent, preferably mat disc on which the light passing through the screw channels is reproduced in the form of circles. The positions of the circles can then be recorded by a camera positioned above the disc. In a subsequent step the area or areas from which the coating is to be removed is or are automatically defined, in particular calculated, on the basis of the recorded positions of the screw channels, whereupon the laser beam is correspondingly moved.

Advantageously, gases and particles that are produced while removing the coating are directly sucked off, the direct extraction preferably taking place through the corresponding screw channel. For this purpose the coating removal system that is used has in particular an extraction device, the extraction opening of which is positioned directly beneath the corresponding screw channel. It is also possible to provide an extraction device with an annular extraction opening which extends directly beneath the hole circle of the screw channels. This type of direct extraction is advantageous since one can dispense with the generation of overpressure, and this additionally has a positive effect upon the cost of the coating removal system.

Preferably, the laser beam is moved in a spiral shape over the individual areas from which the coating is to be removed, in particular from the outside towards the screw channels, missing out the latter. In this way, the coating can be removed in particular from the outer boundaries of the areas from which the coating is to be removed with the highest degree of processing precision.

According to one embodiment of the method according to the invention, at least two coating removal stations are provided for implementation of the method, which stations share a single laser source. In other words, the laser beam generated by the individual light source is steered optionally to the first or to the second coating removal system. The advantage of this is that the cost of the coating removal stations can be considerably reduced.

According to the invention, the coating can additionally be removed from an inner wall of at least one screw channel. Preferably, the laser beam is directed here from a rotating mirror positioned within the screw channel onto the inner wall from which the coating is to be removed.

Furthermore, the present invention devises a coating removal station which is set up to remove the coating from a surface, provided with a coating, of a wheel provided with screw channels and with a centrally positioned opening within one or more areas from which the coating is to be removed, and which extend annularly, in particular circularly around one of the screw channels and/or around the opening, the laser station having positioning means which are designed to position the wheel during the coating removal, an extraction device which is designed such that it or its extraction opening can be positioned, starting from an initial position, on the rear side directly adjacent to a wheel disc of the wheel held by the positioning means, a laser source, in particular in the form of a $CO_2$ laser, and a scanner device by means of which a laser beam generated by the laser source is directed onto an area from which the coating is to be removed, no beam tube adjoining the scanner device.

According to one embodiment of the present invention, the coating removal station comprises a beam deflecting device which is designed and can be positioned on the scanner device such that the laser beam emitted from the scanner device is deflected at an angle rotating about a fixed axis of rotation, the angle being in particular in the range between 80 and 100°, and preferably being 90°. By virtue of this type of beam deflecting device, the coating can also be removed from areas within the screw channels and/or the central opening of the wheel without any problem.

Preferably, the beam deflecting device has a mirror which is fastened to a free end of a pipe which, rotating by means of a drive unit, can be driven about its pipe axis. If the laser beam passing out of the scanner device is directed onto the mirror by the pipe, it will be deflected so as to correspond to the angle of incidence of the mirror. Due to the fact that the mirror, together with the pipe, rotates about the pipe axis, the laser beam also rotates so that, when the mirror is positioned within a screw channel or within the central opening of the wheel, extensive linear paint removal takes place. If the mirror is moved further along the axis of the screw channel or of the central opening, paint is removed from the entire surface of the inner wall of the through hole.

BRIEF DESCRIPTION OF THE DRAWINGS

Additional features and advantages of the present invention are made clear by means of the following description of an embodiment of a method according to the invention with reference to the drawings. These show as follows.

In the following, the same reference numbers refer to identical or identically designed components.

DETAILED DESCRIPTION OF THE PREFERRED EMBODIMENT(S)

Figure 1:
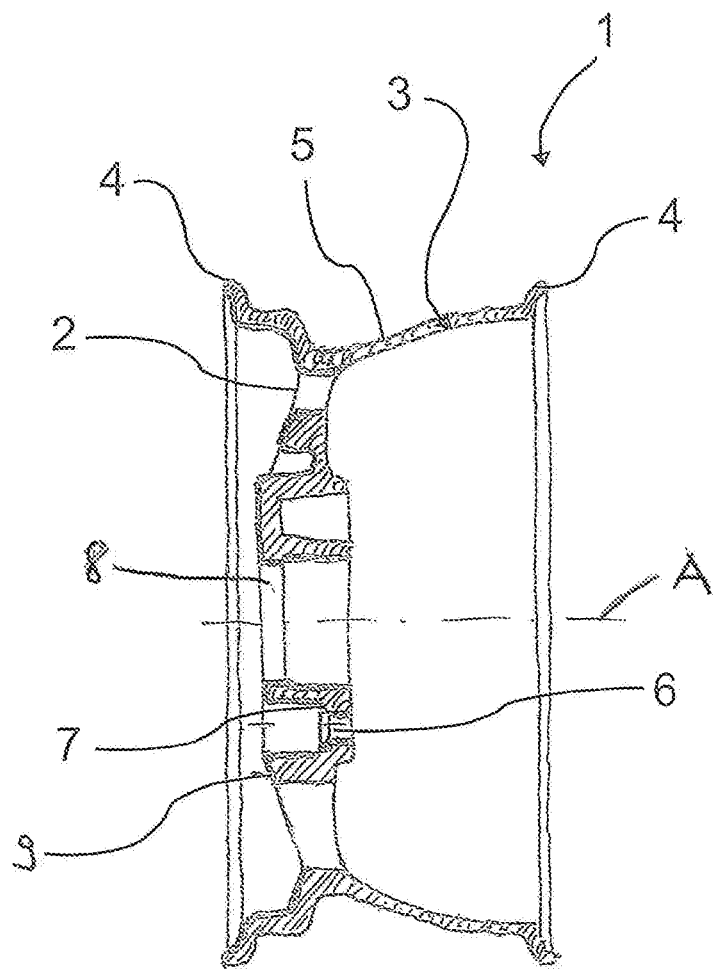
FIG. 1 a schematic view of an exemplary wheel which can be processed using a coating removal method according to an embodiment of the present invention.

FIG. 1 shows a wheel 1 which, in this case, is a light metal wheel made in one part, which has a wheel disc 2 and a rim 3, onto the rim well 5 of which, delimited laterally by rim edges 4, a tyre can be pulled. The wheel disc 2 is provided with a number of screw channels 6 which extend along a circular line around the wheel axle A. Each screw channel 6 is delimited on the outside by a functional surface 7 which forms the contact surface for the head of a fastening screw. Located in the centre of the wheel 1 is an opening 8 for receiving an axle nut. It should be clear that the wheel 1 does not have to be a light metal wheel. The wheel 1 may likewise also be produced from steel, for example. Moreover, the wheel 1 can also be made up of a number of components that are connected to one another. Therefore, a one-part design is not necessary.

The outer surface of at least the rim edge 4 is provided here with a coating 9 which is formed, for example, by a paint. As has already been described in the introductory part of the present application, according to the stipulations of the automotive manufacturers, the functional surfaces 7, which respectively extend annularly or circularly around the individual screw channels 6 and optionally around the opening 8, must be free from paint.

In the following, with reference to FIGS. 2 to 5, a method according to one embodiment of the present invention, by means of which the coating 9 is removed in the region of the functional surfaces (caps and in the region of the opening 8) and in the region of the areas 7 from which the coating is to be removed, as well as a coating removal station 10 used to implement the method are described.

The coating removal station 10 shown in FIGS. 2 to 5 comprises, as its main components, a framework 11, a laser source 12, a scanner device 13, a displacement unit 14, a conveying device 15 extending through the coating removal station 10, which conveying device is provided with a recess 16, positioning means 17, an extraction device 18 and a camera system with a light source 19, a disc 20 and a camera 21.

The framework 11 is made substantially in the form of a frame and is shaped as an upright cuboid, through the lower third of which the conveying device 15 extends substantially horizontally in a Y direction. However, it should be clear that the framework 11 can also basically be of a different structure.

In this case the laser source 12 is a $CO_2$ laser which generates a laser beam in the wave range of 9 to 11 μm with an output of approx. 500 to 2000 W in the cw mode and leads to the scanner device 13 via a deflection mirror (not detailed).

The displacement unit 14, which is positioned in the upper region of the framework 11, enables movement of the scanner device 13 fastened to the latter in the X, Y and Z direction and rotation of the same about the Z axis.

The scanner device 13 directs the laser beam downwards in the direction of the recess 16 which is formed beneath the scanner device 13 in the conveying device 15 and essentially defines the processing area within which coating removal can be implemented. The conveying device 15 itself can be formed, for example, by rotatably driven bars which are arranged spaced equally apart from and adjacent to one another in the Y direction and respectively extend in the X direction.

The positioning means 17 are provided along the conveying device 15 in the region of the recess 16 and are designed so that they hold and fix, such that it is centred, a wheel 1 conveyed by the conveying device 15 in the Y direction above the recess 16 and beneath the scanner device 13. Such positioning means 17 are sufficiently known from conveyance technology, and this is why they are not described in detail here.

The extraction device 18 can be moved from an initial position beneath the conveying device 15, upwards through the recess 16 in the Z direction so that it can be positioned on the rear side directly adjacent to the wheel disc 2 of the wheel 1 held by the positioning means 17. Furthermore, it is possible to move the extraction device 18 in the X and the Y direction so that the extraction device 7 or its extraction opening can be positioned directly beneath the respective screw channels 6 of the wheel 1.

The light source 19 of the camera system is also positioned beneath the recess 16 of the conveying device 15, the light source 19 illuminating the inside of the wheel disc 2 of the wheel 1 held by the positioning means 17. The disc 20, which is made to be transparent and mat, is held between the positioning means 17 and the scanner device 13 and can be moved to and fro in the Y direction such that the disc 20 can optionally be positioned between the wheel 1 fixed by the positioning means 17 and the scanner device 13. A camera 21 which points in the direction of the recess 16 is in turn positioned above the disc 20.

Figure 2:
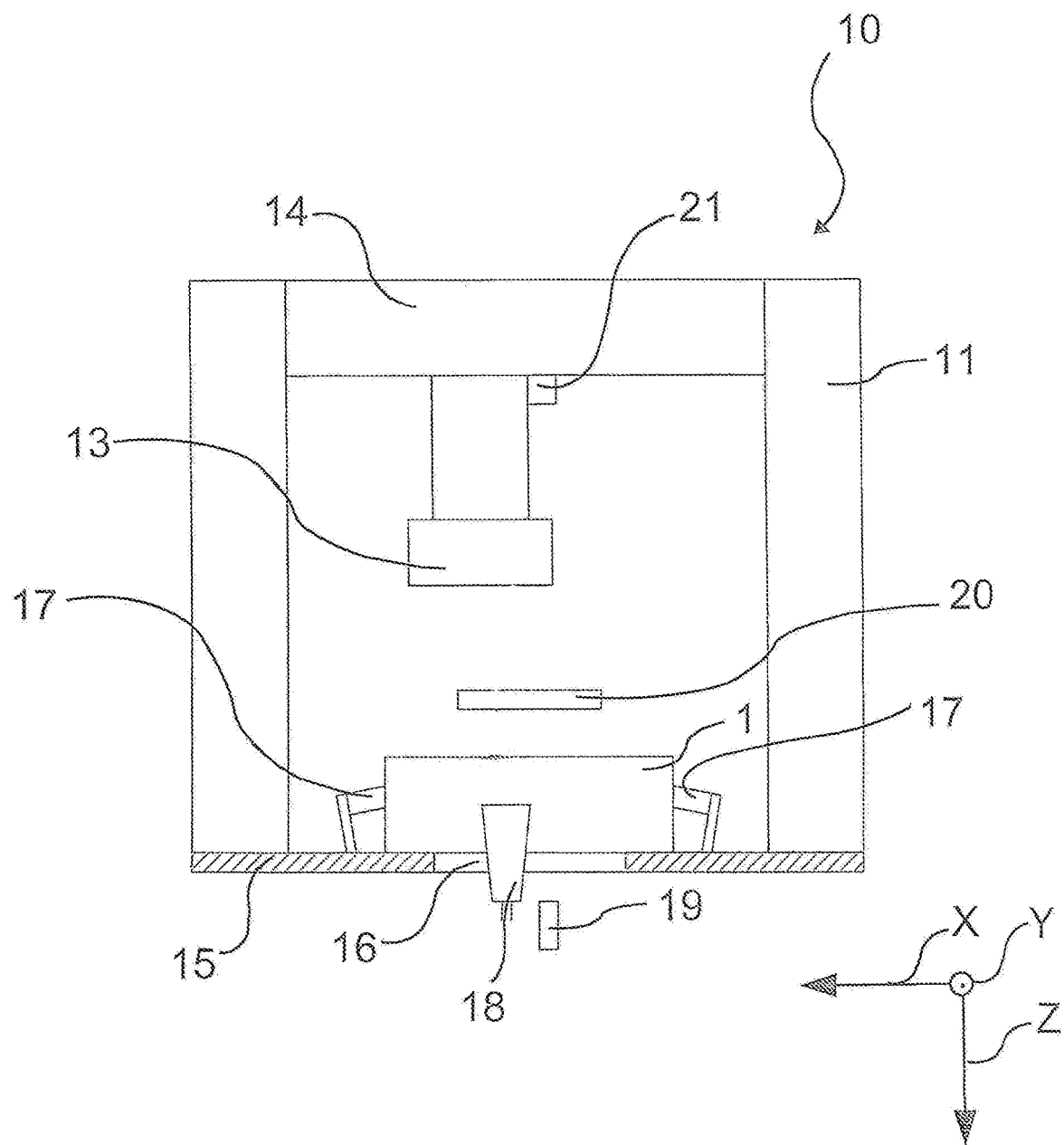
FIG. 2 a schematic front view of a coating removal station which can be used to implement a coating removal method according to an embodiment of the present invention.
Figure 3:
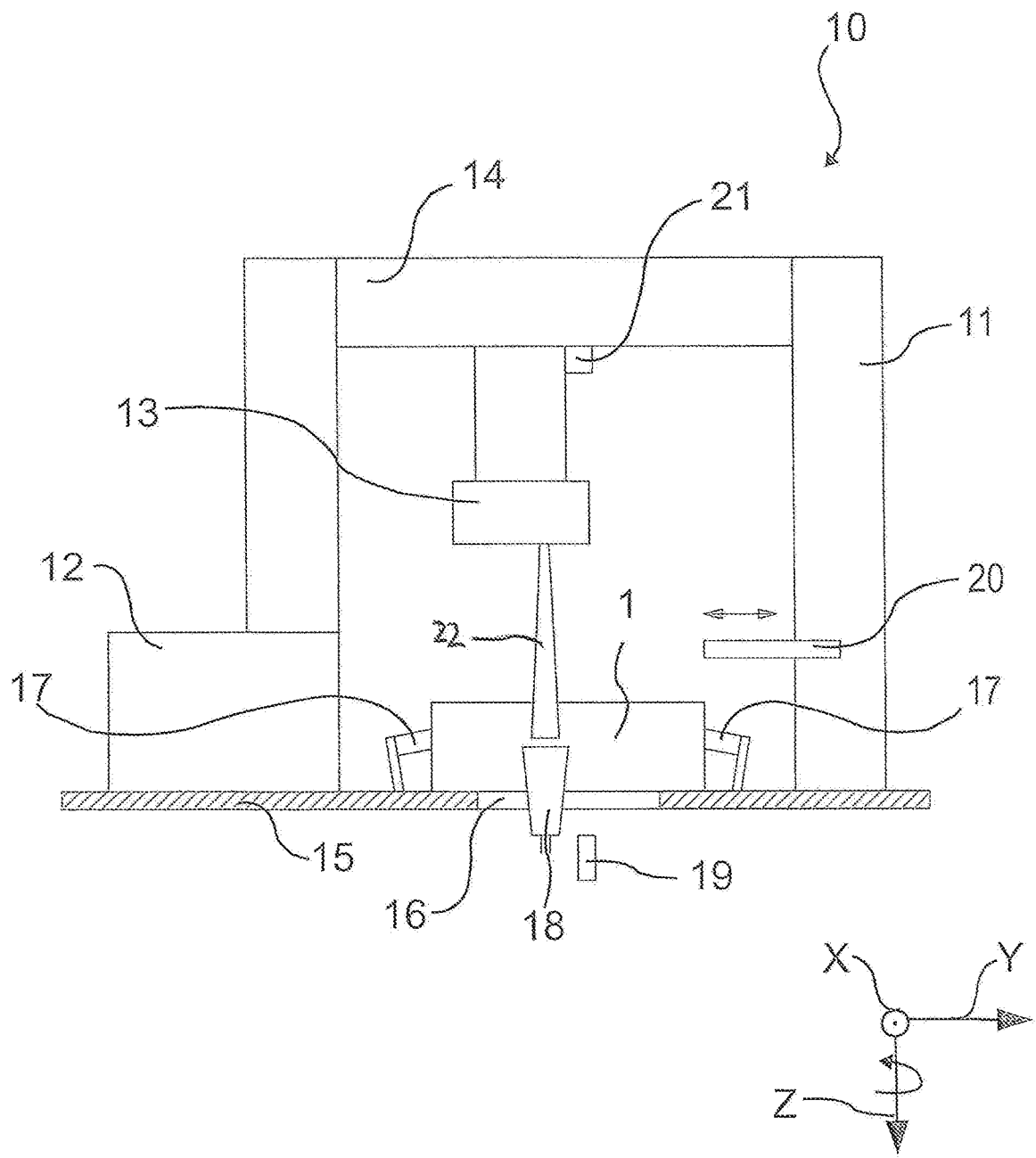
FIG. 3 a side view of the coating removal station shown in FIG. 2.
Figure 4:
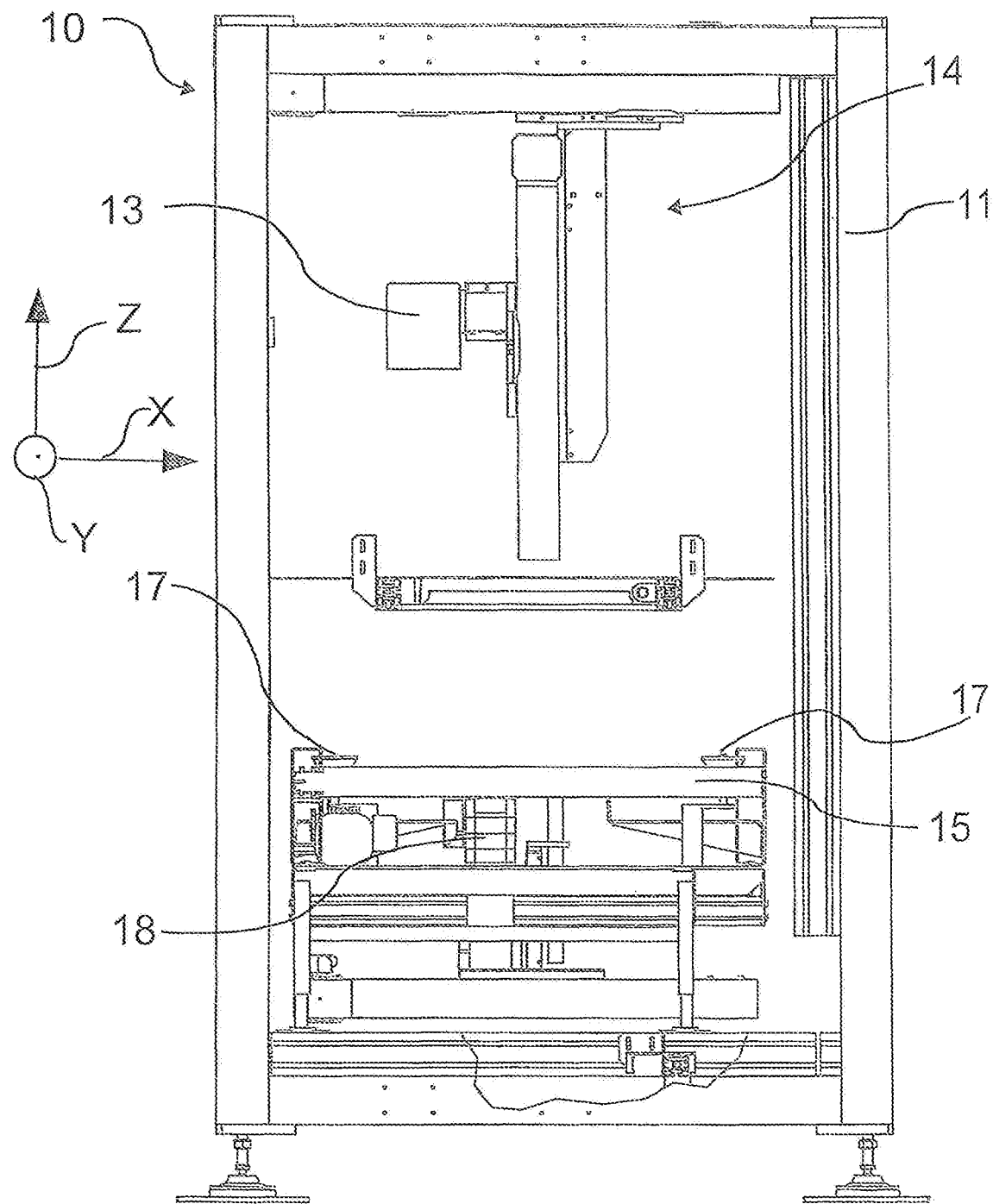
FIG. 4 a detailed front view of a possible embodiment of the coating removal station shown in FIGS. 2 and 3.
Figure 5:
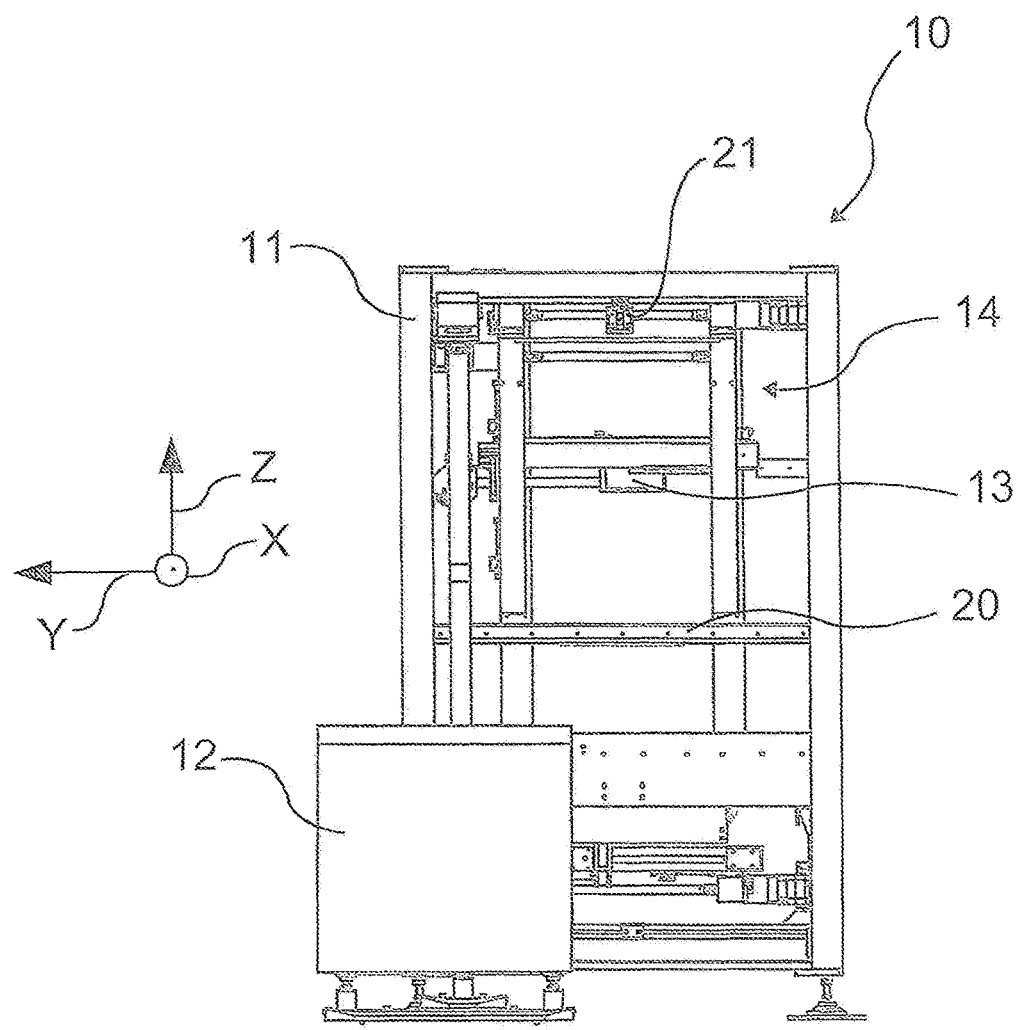
FIG. 5 a side view of the coating removal station shown in FIG. 4.

In order to remove the coating from areas from which the coating is to be removed or from the functional surfaces 7 of a wheel 1, the wheel 1 positioned on the conveying device 15 is moved into the coating system 9, is held above the recess 16 provided in the conveying device 15 and is centred and fixed using the positioning means 17. In order to record the position of the screw channels 6, and so of the functional surfaces 7 of the wheel 1 from which the coating is to be removed, in a further step, as shown in FIG. 2, the disc 20 is positioned above the wheel 1, whereupon the light source 19 illuminates the rear side of the rim edge 4 from below through the recess 16 of the conveying device 15 so that the light passing through the screw channels 6 reproduces corresponding circles of light on the disc 20. The precise positions of these circles of light are recorded by the camera 21, whereupon the positions of the functional surfaces 7 are calculated and communicated to the control system. In a further step the disc 20 is then moved in the Y direction so that it is positioned outside of the processing region in accordance with FIG. 3. The extraction device 18 is then moved upwards in the Z direction and is positioned beneath a screw channel 6 which is surrounded by the functional surface 7 from which the coating is to be removed in the next step. Next, the laser beam 22 generated by the laser source 12 is directed by the scanner device 13 towards the corresponding functional surface 7, the laser beam being moved in a spiral shape over the functional surface 7 and removing the coating 9 positioned on the latter, preferably starting from the outside in the direction of the screw channel 6, missing out the latter. Any gases and particles produced during the coating removal are sucked off by the extraction device 18 through the corresponding screw channel 6. After removing the coating from the first functional surface 7, the other functional surfaces 7 of the wheel 1 are also processed in a corresponding manner. After the coating has been removed from all of the functional surfaces 7 the positioning means 17 release the wheel 1 again so that the latter is moved out of the coating removal station 10 in the Y direction by the conveying device 15.

The coating removal method described above is characterised in particular in that masking of the areas of the wheel 1 from which the coating is to be removed is not required. This means that the coating removal station 10 can have a simple structure. Furthermore, cycle times can be very short.

Figure 6:
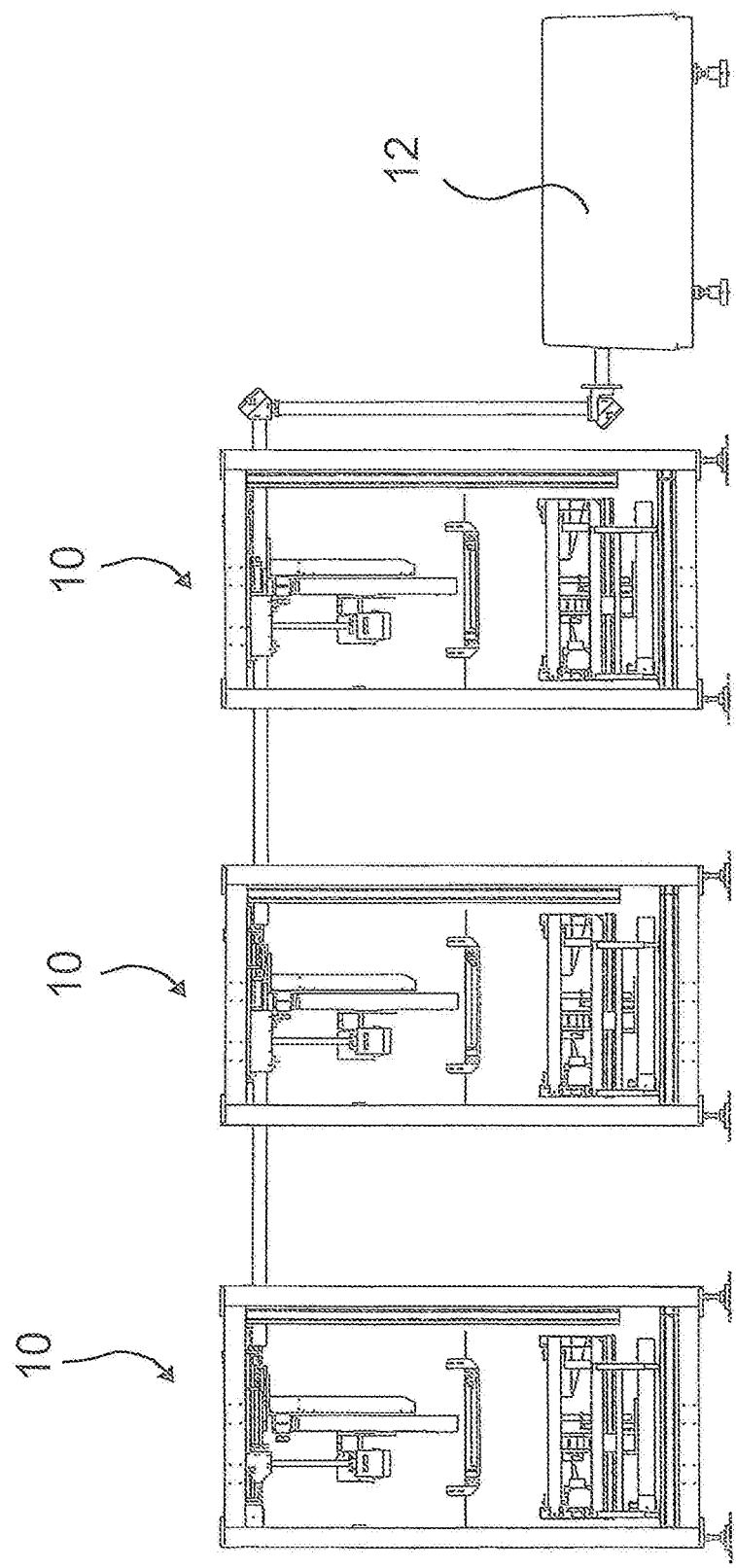
FIG. 6 a front view of three coating removal stations of the type shown in FIGS. 4 and 5, which share a single laser source, and FIG. 7 a schematic side view of a modified coating removal station according to the present invention.

FIG. 6 shows a number of, in this case three, coating stations 10 arranged parallel to one another and which all share a single laser source 12. In other words, the laser beam generated by the laser source 12 can optionally be conveyed to one of the scanner devices 13 of the three coating removal stations 10. Correspondingly, two coating removal stations 10 can be equipped with new workpieces or wheels 1, while the coating is removed from a wheel 1 in the third coating removal station 10. In this way costs and cycle times can be further reduced.

Figure 7:
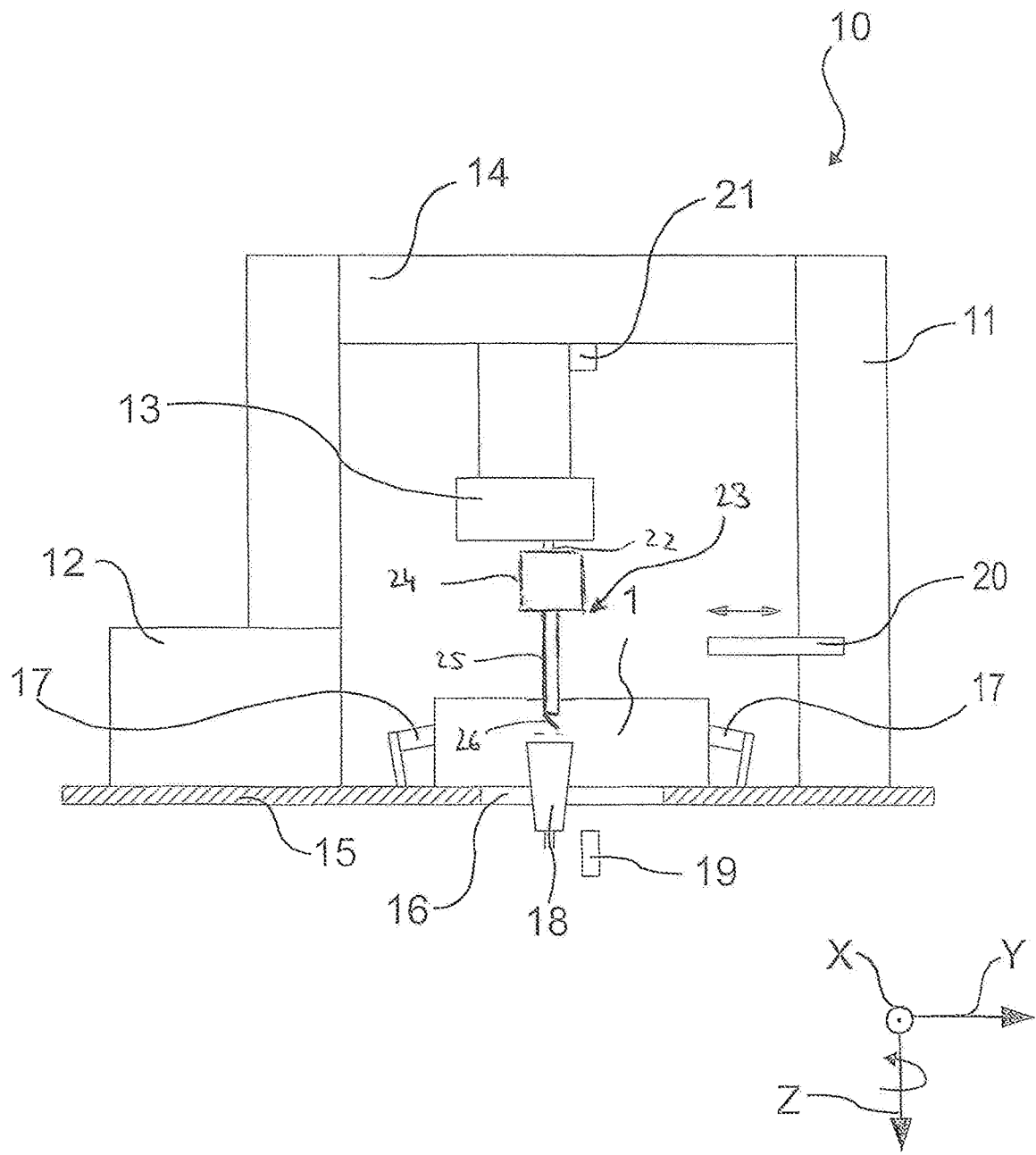

FIG. 7 shows a coating removal station 10 similar to FIGS. 2 to 5 which is modified to the effect that there is fitted to the scanner device 13 a beam deflecting device 23 which has a drive unit 24, a pipe 25 that can be driven by the drive unit 24 to rotate about its pipe axis, and a mirror 26 fastened to the free end of the pipe 25, which mirror is in this case positioned at an angle of 45° to the pipe axis so that a laser beam 22 conveyed from the scanner device 13 through the pipe 25 is deflected at an angle of 90°. The dimensions of the pipe 25 and of the mirror 26 are chosen such that the pipe 25, together with the mirror 26 held on the latter, can be introduced from above into the screw channels 6 by the displacement unit 14 being moved accordingly. If the pipe 25 and the mirror 26, in the state introduced into a screw channel 6, are rotated about the pipe axis and are additionally moved by the displacement unit 14 in the Z direction, the coating is removed from the inner wall of the screw channel 6.

It should be clear that the exemplary embodiment described above is not to be considered to be restrictive. In fact, modifications are possible, without straying from the scope of protection of the present invention which is defined by the attached claims.

I claim:

1. A method for removing a coating (9) on a surface of a wheel (1), the wheel (1) provided with screw channels (6) and with a central opening (8), each of the screw channels (6) and the central opening (8) is delimited by an area (7) from which the coating is to be removed, each of the areas (7) extends annularly around one of the screw channels (6) or around the central opening (8), the method being implemented using a laser beam (22) generated by a laser source (12), the method comprising the steps of:
    a) positioning an extraction opening of an extractor (18) directly beneath a center of one of the screw channels (6) or the central opening (8) surrounded by the area (7) from which the coating is to be removed;
    b) removing the coating from the area (7) by moving the laser beam over the area (7) from which the coating is to be removed, without masking the area (7) from which the coating is to be removed;
    c) extracting with the extractor gases and particles produced during the step of removing the coating directly through one of the screw channels (6) or the central opening (8); and
    d) repeating steps a) through c) and removing the coating from each of the screw channels (6) of the wheel (1) and the central opening (8) from the areas (7) surrounding the screw channels (6) and the central opening (8).

2. The method according to claim 1, wherein the wheel (1) is fixed, wherein positions of the screw channels (6) and/or of the central opening (8) are automatically recorded, wherein the areas (7) from which the coating is to be removed are automatically defined on the basis of the recorded positions and the laser beam is correspondingly moved, and wherein fixing of the wheel (1) takes place such as to center the wheel (1).

3. The method according to claim 1, wherein the laser beam is moved in a spiral shape over the area (7) from which the coating is to be removed.

4. The method according to claim 1, characterised in that at least two coating removal stations (10) are provided for the implementation of the method, which stations share a single laser source (12).

5. The method according to claim 1, including the steps of:
    positioning the extraction opening of the extraction device (18) directly beneath a center of one of the screw channels (6);
    extracting with the extraction device gases and particles produced during the step of removing the coating directly through the associated one of the screw channels (6); and
    repeating steps a) through c) and removing the coating from each of the screw channels (6) of the wheel (1) from the areas (7) surrounding the screw channels (6).

6. The method according to claim 1, wherein a fibre laser or an Nd:YAG laser in a continuous wave mode or in a pulsed mode is used as the laser source (12), and wherein the laser beam being in the wavelength range of 1 to 1.1 μm.

7. The method according to claim 6, wherein the wheel (1) is fixed, wherein positions of the screw channels (6) and/or of the central opening are automatically recorded, wherein the areas (7) from which the coating is to be removed are automatically defined on the basis of the recorded positions and the laser beam is correspondingly moved, and wherein fixing of the wheel (1) takes place such as to center the wheel (1).

8. The method according to claim 1, characterised in that wherein the gases and particles that are produced while removing the coating are directly extracted.

9. The method according to claim 8, wherein a direct extraction of the gases and particles takes place through the one of the screw channels (6).

10. The method according to claim 1, characterised in that the coating is additionally removed from an inner wall of at least one screw channel (6).

11. The method according to claim 10, characterised in that while the coating is being removed from the inner wall of a screw channel (6), the laser beam (6) is directed from a rotating mirror (26) positioned within the screw channel (6) onto the inner wall.

12. The method according to claim 1, wherein the laser beam is moved by a scanner (13) over the at least one area (7) of the surface from which the coating is to be removed.

13. The method according to claim 12, wherein a fibre laser or an Nd:YAG laser in a continuous wave mode or in a pulsed mode is used as the laser source (12), and wherein the laser beam is in the wavelength range of 1 to 1.1 µm.

14. The method according to claim 12, wherein the wheel (1) is fixed, wherein positions of the screw channels (6) and/or of the central opening are automatically recorded, wherein the areas (7) from which the coating is to be removed are automatically defined on the basis of the recorded positions and the laser beam is correspondingly moved, and wherein fixing of the wheel (1) takes place such as to center the wheel (1).

15. The method according to claim 1, wherein a $CO_2$ laser is used as the laser source (12), and wherein the laser beam being in the wavelength range of 9 to 11 µm.

16. The method according to claim 15, wherein the wheel (1) is fixed, wherein positions of the screw channels (6) and/or of the central opening are automatically recorded, wherein the areas (7) from which the coating is to be removed are automatically defined on the basis of the recorded positions and the laser beam is correspondingly moved, and wherein fixing of the wheel (1) takes place such as to center the wheel (1).

17. The method according to claim 15, wherein the $CO_2$ laser is operated in a continuous wave mode.

18. The method according to claim 17, wherein the wheel (1) is fixed, wherein positions of the screw channels (6) and/or of the central opening are automatically recorded, wherein the areas (7) from which the coating is to be removed are automatically defined on the basis of the recorded positions and the laser beam is correspondingly moved, and wherein fixing of the wheel (1) takes place such as to center the wheel (1).

* * * * *